US008381113B2

(12) United States Patent
Kamdar et al.

(10) Patent No.: US 8,381,113 B2
(45) Date of Patent: Feb. 19, 2013

(54) METADATA-DRIVEN AUTOMATIC UI CODE GENERATION

(75) Inventors: Nirav A. Kamdar, Redmond, WA (US); Sanjib K. Dutta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 11/784,222

(22) Filed: Apr. 6, 2007

(65) Prior Publication Data
US 2008/0250313 A1 Oct. 9, 2008

(51) Int. Cl.
*G06F 3/00* (2006.01)
(52) U.S. Cl. ......... 715/760; 715/700; 715/710; 715/714
(58) Field of Classification Search .................. 709/223, 709/224; 715/700, 710, 714, 760
See application file for complete search history.

(56) References Cited

U.S. PATENT DOCUMENTS

| 6,053,951 | A | 4/2000 | McDonald et al. |
| 6,876,314 | B1 | 4/2005 | Lin |
| 7,010,580 | B1 * | 3/2006 | Fu et al. ........................ 709/217 |
| 7,062,502 | B1 | 6/2006 | Kesler |
| 7,080,350 | B2 | 7/2006 | Saimi et al. |
| 7,526,457 | B2 * | 4/2009 | Duevel et al. ................... 706/11 |
| 7,594,141 | B2 * | 9/2009 | Kalavacharla et al. ......... 714/38 |
| 7,644,351 | B1 * | 1/2010 | Portnoy et al. ................. 715/226 |
| 2003/0084034 | A1 * | 5/2003 | Fannin .............................. 707/3 |
| 2003/0146937 | A1 | 8/2003 | Lee |
| 2004/0017392 | A1 * | 1/2004 | Welch ........................... 345/738 |
| 2004/0056890 | A1 * | 3/2004 | Hao et al. ...................... 345/744 |
| 2004/0205696 | A1 | 10/2004 | Chupa et al. |
| 2004/0225751 | A1 * | 11/2004 | Urali ............................. 709/246 |
| 2004/0230945 | A1 | 11/2004 | Bryant et al. |
| 2005/0228881 | A1 * | 10/2005 | Reasor et al. ................. 709/224 |
| 2006/0106897 | A1 * | 5/2006 | Sapozhnikov et al. ....... 707/204 |
| 2006/0143148 | A1 | 6/2006 | Degtyar et al. |
| 2006/0155710 | A1 * | 7/2006 | Dorsey .......................... 707/100 |

OTHER PUBLICATIONS

Damyanov, et al., "Metadata Driven Code Generation Using .NET Framework", Date: 2004, http://ecet.ecs.ru.acad.bg/cst04/Docs/sIIIB/32.pdf.
Padilla, et al., "Automatic MetaData-Based Development", Date: 2004, http://ieeexplore.ieee.org/iel5/9302/29568/01342625.pdf?isNumber=.

* cited by examiner

*Primary Examiner* — Weilun Lo
*Assistant Examiner* — Truc Chuong

(57) ABSTRACT

A framework for using metadata to describe user interface elements and for interactions of the user interface elements with an end user and/or with data source(s) that store configuration data. The metadata can be used to generate a settings UI and code that manages the UI such as gathering user input, handling UI events, validating collected data, handling errors and warnings, managing interactions between different UI controls, and the like. A computer-implemented system that facilitates a settings user interface can include a code generation component that employs the stored metadata to automatically generate the settings UI and code that manages the UI. The code generation component provides the generated code to a data source component that interacts with the data source(s). The settings UI is displayed to an end user via a user interface component.

20 Claims, 11 Drawing Sheets

METADATA-DRIVEN AUTOMATIC UI CODE GENERATION

BACKGROUND

Computer products (e.g., hardware and/or software) typically have one or more associated settings that can be set and/or modified by an end user of the products. These settings are generally used for configuring a system and/or an application although they can be used for other purposes such as customizations, diagnostics, etc. The settings are generally stored in one or more data sources (e.g., a SQL database, Microsoft Active Directory™, registry, XML files, .txt files, .ini files, etc.). In order to manipulate these settings, most systems provide a friendly graphical user interface (GUI or UI). The UI to manipulate these settings can be referred to as a settings UI.

Conventionally, there are a variety of ways to implement such a settings UI. For example, Microsoft Management Console (MMC) can be employed for server applications, ASP (active server page)/HTML pages can be used for web-based applications, standard and/or custom Win32 controls can be used for client applications. The settings UI can include several UI controls (e.g., a checkbox, a list box, a combination box, a text box, a radio button, etc.). The UI control can be grouped together into one or more sections and/or pages.

Historically, code has been written to implement these UI controls. This code is often bulky, repetitive in nature, and error prone. Additionally, when new UI control(s) (e.g., for new configuration settings) are added, additional code is written, for example, for data retrieval/storage into a data source, for error handling, for validating data received in the control(s), for handling UI event(s) (e.g., click of a button, obtaining focus, etc.) and the like. The process of code creation can be a cumbersome exercise and can often be the source of code bugs.

Additionally, as underlying UI technology changes, UI settings code is generally rewritten in order to reflect the change. For example, if a certain settings UI is implemented using MMC for a first version of a product and then there is need to provide a web interface in a later version of the product, new code would have to be developed.

Similarly, if a data source changes, much of the code would need to be rewritten. For example if settings are stored in SQL and then moved to Active Directory, the code in existing settings pages would need to be altered to use the new data source.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a mechanism for using metadata to describe user interface (UI) elements and for interactions of the UI elements with an end user and/or with data source(s) that store configuration data. The metadata can be used to generate a settings UI and code that manages the UI such as gathering user input, handling UI events, validating collected data, handling errors and warnings, managing interactions between different UI controls, and the like.

A computer-implemented system that facilitates a settings user interface is provided. The system is based on a framework which employs stored metadata to describe instances of UI elements. The framework further details interactions of the UI elements with both the end user and with data source(s) that store configuration data (e.g., settings).

The system includes a code generation component that employs the stored metadata to generate the settings UI and code that manages the UI. The code generation component provides the generated code to a data source component that interacts with the data source(s). Code for the data source component can also be generated from metadata. The data source component provides the settings UI to a user interface component that displays the settings UI to an end user. The user interface component and the data source component thus facilitate viewing and/or modification of stored configuration data by the end user.

Thus, the system provides a way to produce generic implementations for standard UI controls that can be used by most controls in a settings UI. The system can further provide for the addition of custom actions which gives the UI developer power to customize part(s) of the UI while using generic implementations for other parts.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
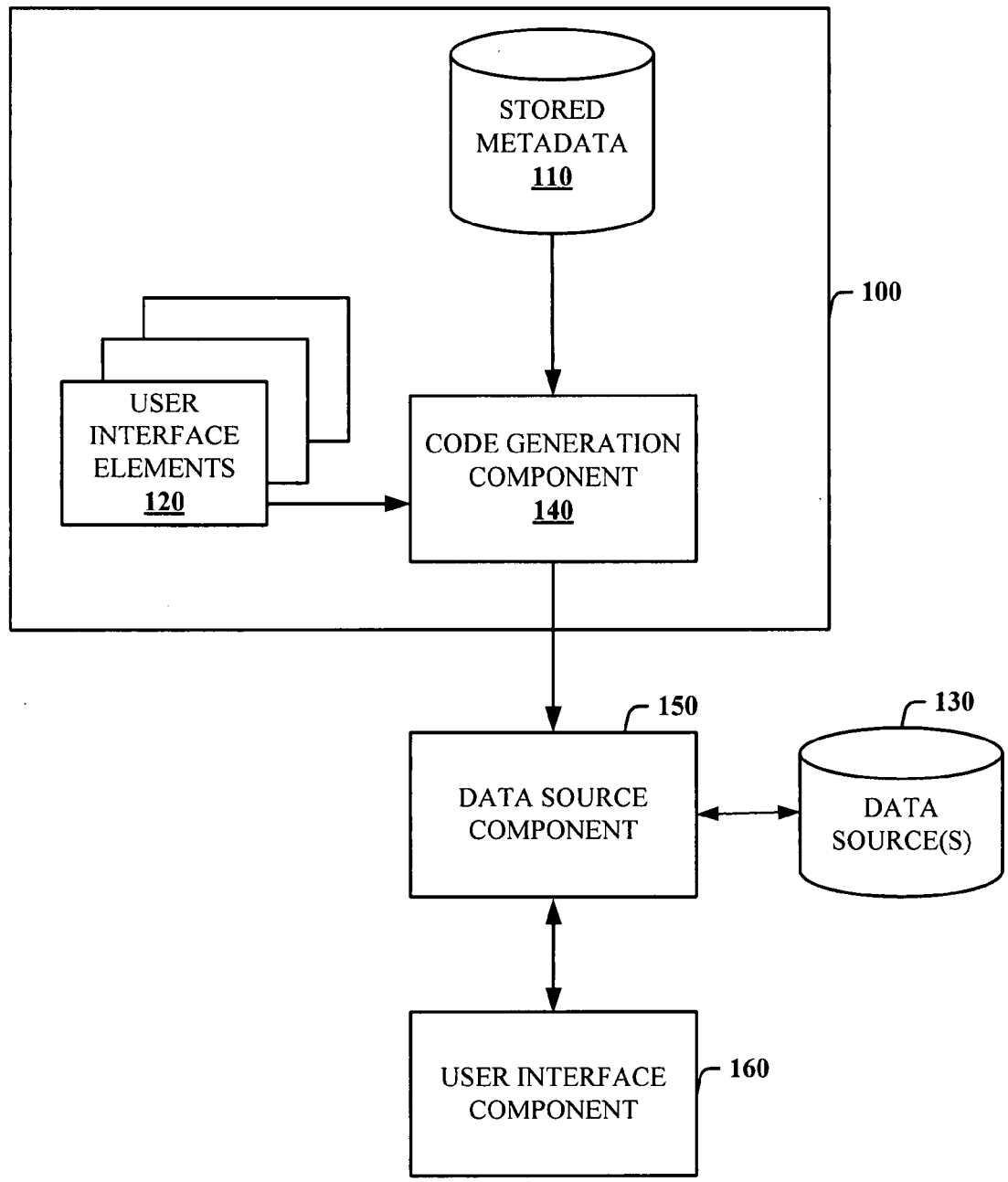
FIG. 1 illustrates a computer-implemented system that facilitates a settings user interface.

The disclosed architecture provides a mechanism for using metadata to describe UI elements. The architecture further provides for interactions of the UI elements with an end user and/or with data source(s) that store configuration data. For example, the metadata can be used to generate settings UI and code that manages the UI (e.g., gathering user input, handling UI events, validating collected data, handling errors and warnings, managing interactions between different UI controls, etc.).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates a settings user interface. The system 100 is based on a framework which employs stored metadata 110 to describe instance of UI elements 120. The framework further details interactions of the UI elements with both the end user and with data source(s) 130 that store configuration data (e.g., settings).

The system 100 includes a code generation component 140 that employs the stored metadata 110 to generate the settings UI. The code generation component 140 can further generate code that manages the UI. For example, the code generation component 140 can generate code for gathering user input, handling UI event(s), validating collected data, handling error(s) and/or warning(s), managing interactions between different UI controls, and the like.

The code generation component 140 provides the generated code to a data source component 150 that interacts with the data source(s) 130. Code for the data source component 150 can also, optionally, be generated from metadata. The data source component 150 provides the settings UI to a user interface component 160. The user interface component 160 displays the settings UI to an end user. The user interface component 160 and the data source component 150 thus facilitate viewing and/or modification of stored configuration data by the end user.

By automatically generating code that handles common UI controls and events, the system 100 can greatly reduce the size of code to be written and maintained. Further, defects that typically arise out of creating UI code can be reduced.

The system 100 can be based on a modular design in which the UI elements 120 are distinct functional blocks. As such, changes in UI technology and/or data source(s) can be incorporated by the system 100 with minimal changes.

In one embodiment, the stored metadata 110 can be consumed at runtime. In this example, the user interface elements 120 are segregated from the stored metadata 110. The metadata is shipped with the user interface elements 120 and read at runtime. In this embodiment, since the metadata is consumed during runtime, the metadata can be changed (e.g., after the product has been shipped). Thus, if a new UI page and/or control needs to be added after the product has been shipped, it can be achieved by changing the metadata. Thus, consumption of the metadata at runtime can increase flexibility though it can lead to inefficiency since the metadata is parsed and read at runtime.

In another embodiment, the metadata 110 can be parsed, read, and processed at compile time. In this example, code is generated (e.g., in the form of data structures and/or code) from the metadata and compiled into a binary at compile time. At runtime, there is no metadata to parse since the metadata has been converted into code which can lead to increased efficiency. In this example, each item of interest can be converted into data structures (e.g., event maps, list of controls, error codes and/or error strings, etc). The system 100 code can employ and act on these data structures.

As discussed in greater detail below, the system 100 can further, optionally, support custom action(s) to override the generic implementations. This can be a powerful feature that lets the UI developer use the generic code for most of the common UI controls but at the same time give the UI developer full control to override the generic implementations for the controls that need more advanced and/or special handling.

Figure 2:
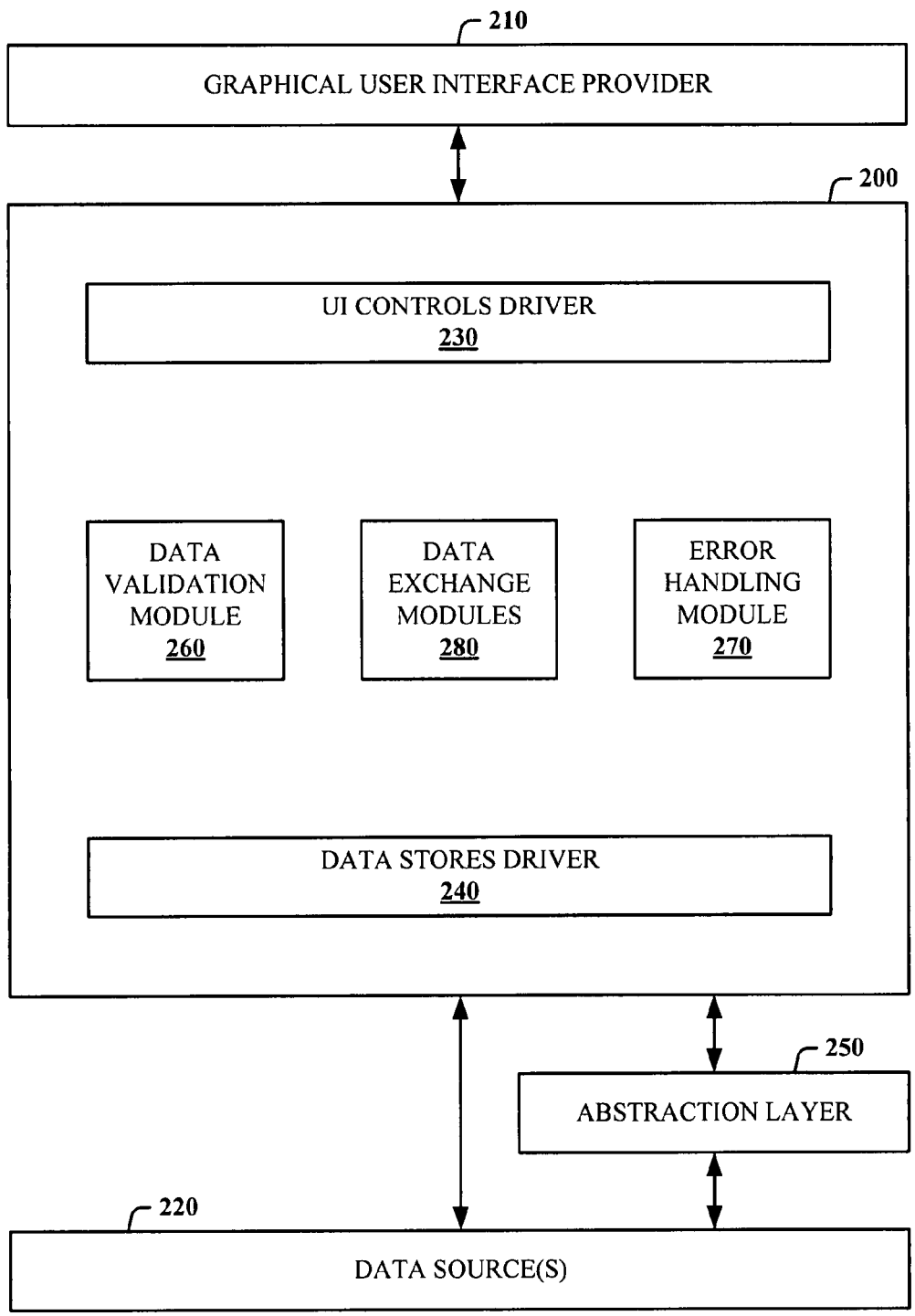
FIG. 2 illustrates an alternative computer-implemented system that facilitates a settings user interface.

Turning to FIG. 2, a computer-implemented system 200 that facilitates an alternative settings user interface is illustrated. Through a graphical user interface provider 210, the system 200 facilitates an end user to interaction with configuration data stored in one or more data sources 220.

The system 200 includes code generated based on a framework which employs stored metadata to describe UI elements (e.g., system 100). In one embodiment, the code is generated at compile-time. In another embodiment, the code is generated at run-time.

The system 200 includes a UI controls driver 230 which is a component responsible for managing UI controls and responding to interactions of an end user with the UI controls. The UI controls driver 230 can be sensitive to the UI technology employed as the UI control driver 230 interacts directly with the UI technology. For example, with respect to the Win32 UI technology, the UI controls driver 230 can include event handlers (e.g., message loops, command/notify handlers, message maps, etc.) that take some action based on input received from the end user.

In this example, the system 200 further includes one or more data stores drivers 240. The data stores driver 240 is a component responsible for reading and/or writing data to/from the data source(s) 220. The data stores driver 240 can be sensitive to the data source(s) 220 and the format in which data is stored.

In one embodiment, optionally, an abstraction layer 250 between the data source(s) 220 and the system 200 is provided (e.g., WMI-Windows Management Instrumentation). In this manner, the data stores driver 240 reads and/or writes to/from the abstraction layer 250 which, in turn, communicates with the data source(s) 220.

The system 200 further includes a data validation module 260 which is a component that validates data received from the end user before it is written to the data source(s) 220. For example, the validation module 260 can receive the data to validate using a well known interface, validate the data using predefined validation rules and either report success or throw error(s)/warning(s) that can be displayed to the end user. Optionally, the validation module 260 can also validate data after it is read from the data source(s) 220 (e.g., before it is displayed to the end user) to ensure that the incoming data has not been corrupted.

Further, the system 200 can include an error handling module 270 which is a component that is responsible for processing error code(s), if any, received from various parts of the system 200. The error handling module 270 can convert the error code(s) into user friendly error message(s).

In one embodiment, each UI control has a set of error codes associated with the UI control. The metadata defines the error messages to be displayed with each of these error codes. When a particular error is raised, the error handling module 270 finds the error message based on the error code. Through the UI controls driver 230 and the graphical user interface provider 210, the error handling module 270 causes the error message to be displayed to the end user and, optionally, sets focus on a correct section of the UI so that the end user can easily rectify a situation that caused the error.

The system 200 further includes one or more data exchange modules 280. In one embodiment, the system 200 includes a generic data exchange module 280 for each type of common UI control. For example, the system 200 can include a data exchange module 280 for checkboxes, for text boxes, for list boxes, for combo boxes, and the like.

The data exchange module 280 can take data from an interface exposed by the data stores driver 240 and populate a corresponding UI control with the data. Similarly, the data exchange module 280 can take data from a UI control and provide the data to the data stores driver 240.

In one embodiment, the UI controls driver 230, the data stores driver 240, the data validation module 260, the error handling module 270 and the data exchange modules 280 have an interface that describes a format in which the particular component accepts data and produces results. In this manner, each particular component is aware of the interfaces of the other components with which the particular component interacts which can make it easy to update any of the modules without disturbing other dependent modules.

Figure 3:
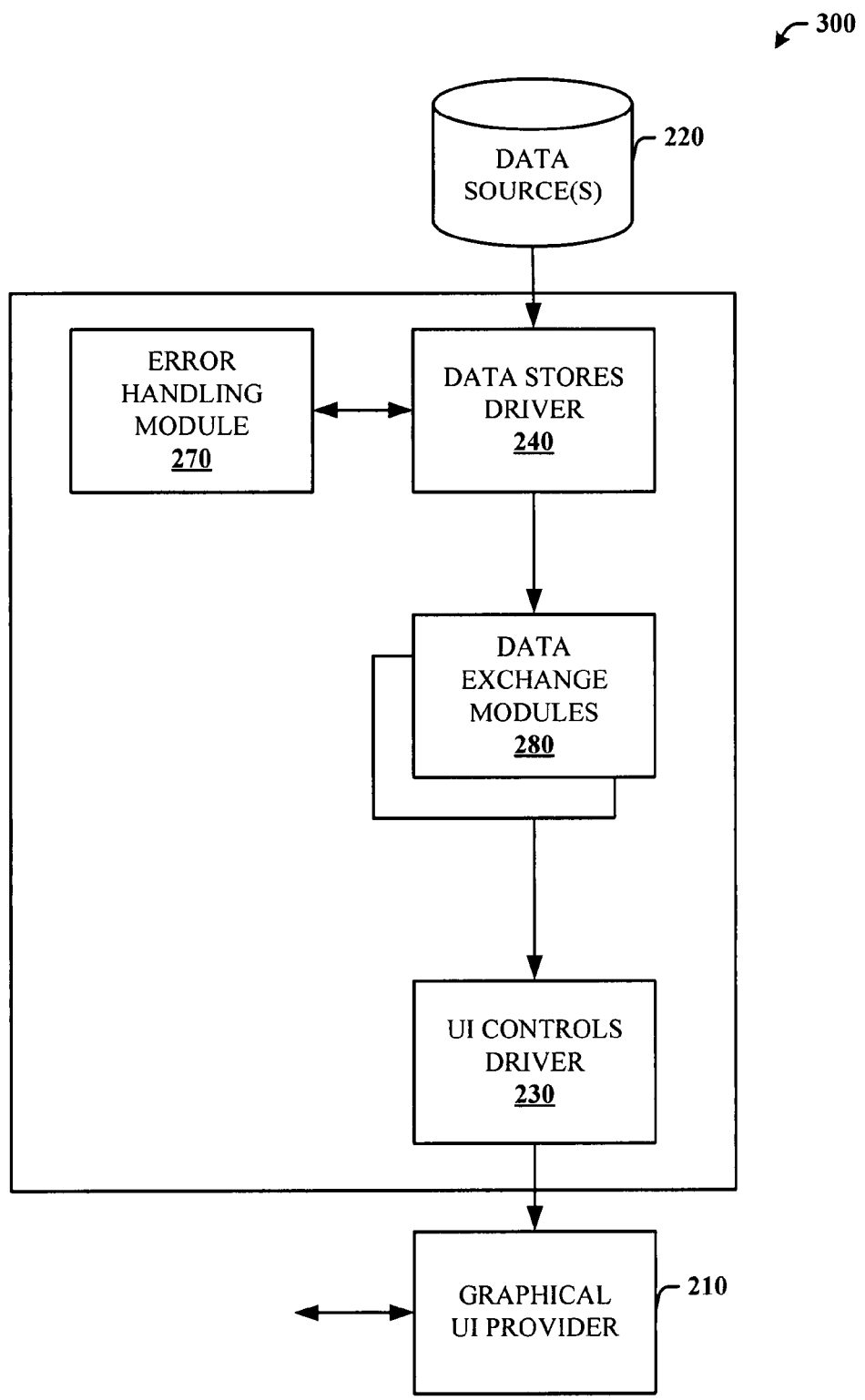
FIG. 3 illustrates a computer-implemented system that facilitates a settings user interface for read time.

Referring next to FIG. 3, a computer-implemented system 300 that facilitates a settings user interface for read time is illustrated. In this example, control and data flow during read time is described. For example, read time can be in response to an end user launch of the UI by opening a page that contains UI controls.

At read time, the system 300 determines which UI controls are to be displayed and based upon the UI controls, invokes the data stores driver 240 to read corresponding data from the data sources 220. If an error occurs while reading, the data sources driver 240 raises an error code that is translated by the error handling module 270 to a user friendly error message and is displayed to the end user. If there is no error, the data read is provided to the data exchange modules 260 which in turn populate corresponding UI controls which are provided to the UI provider 210 through the UI controls driver 230.

Figure 4:
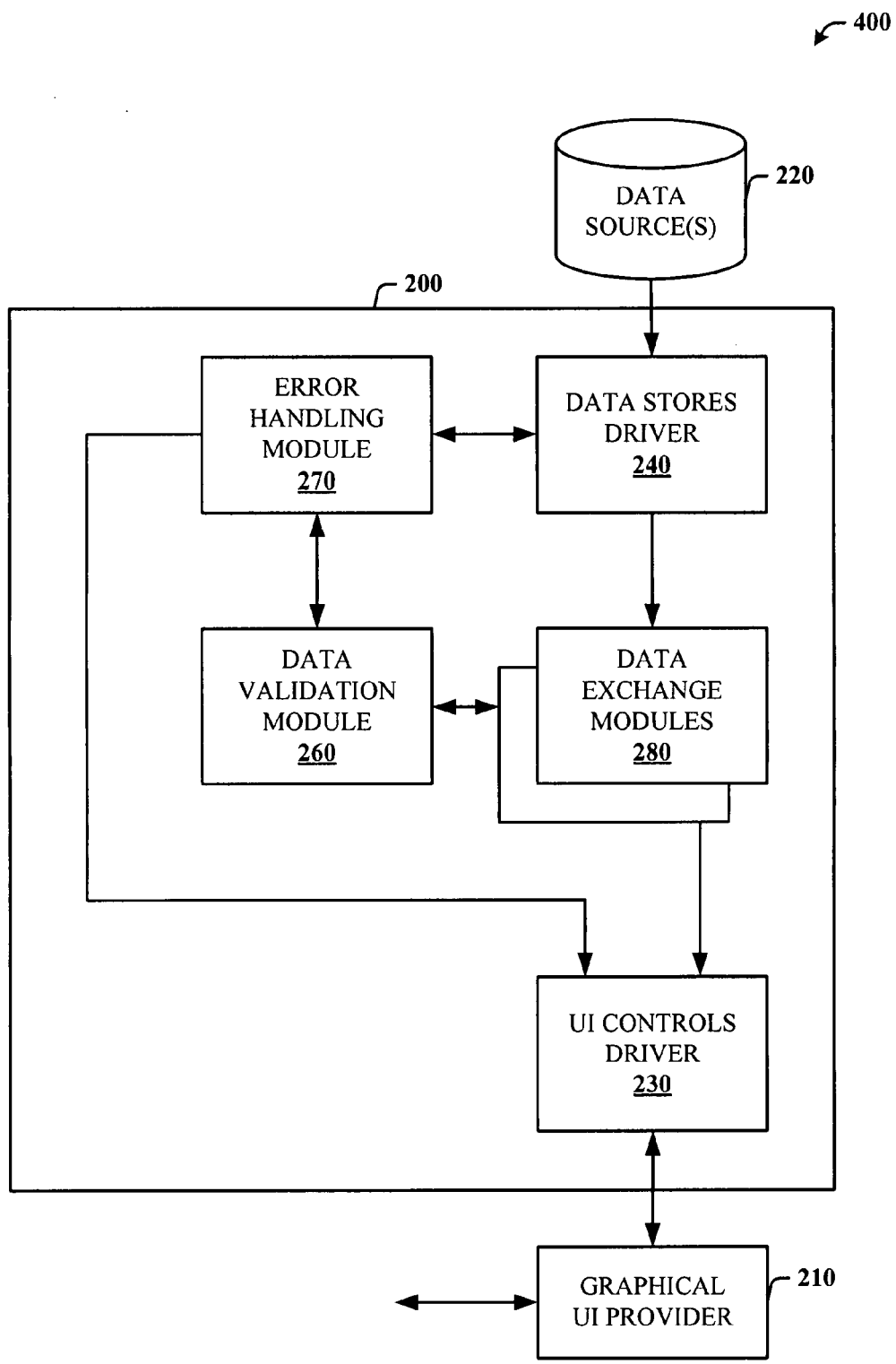
FIG. 4 illustrates a computer-implemented system that facilitates a settings user interface for write time.

Turning to FIG. 4, a computer-implemented system 400 that facilitates a settings user interface for write time is illustrated. In this example, control and data flow during write time is described. For example, write time can be in response to an end user modification to data and request to apply the modified data.

The UI controls driver 230 responds to end user change(s) (e.g., clicks on parts of UI, adds text to some controls, etc.). The UI controls driver 230 can take further action(s) based on the stored metadata used to generate the code that drives the UI controls driver. For example, if a checkbox is unchecked, the UI controls driver 230 can disable certain nested controls. Further, if a button is clicked, the UI controls driver 230 can launch a new UI page. When a new UI page is launched, the read time described above with respect to FIG. 3 can be repeated for that page.

At write time, the data exchange modules 280 collect data from the UI controls and provide the data to the data validation module 260. The data validation module 260 validates the data (e.g., according to validation rules defined in the metadata). The data is then provided to the data stores driver 240 to be written back to the data source 220. If an error is raised either during validation and/or during write-back, the error handling module can be invoked, as discussed previously.

The use of metadata for simple common controls and, more particularly, the use of metadata to drive the components described above will be explained with Microsoft Management Console (MMC) used as the graphical UI provider 210. It is to be appreciated that MMC is one example of a graphical UI provider 210 and that all other suitable graphical UI providers are intended to be encompassed by the hereto appended claims.

MMC has property sheets that house many property pages which in turn house several UI controls. In addition, dialogs can be invoked by clicking on buttons in property pages and/or other dialogs.

In this example, the metadata that is used to drive the various components of the system 400 structured by UI pages. Each UI page (called a "property page" in MMC) contains one or more UI controls.

Figure 5:
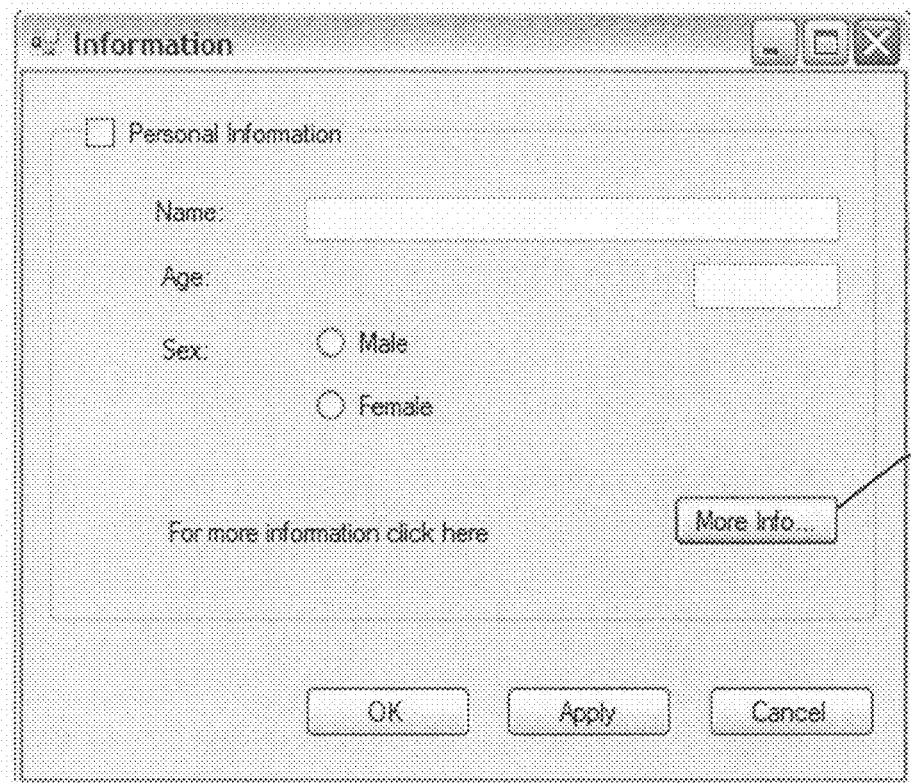
FIG. 5 illustrates an exemplary user interface of a property page.
Figure 6:
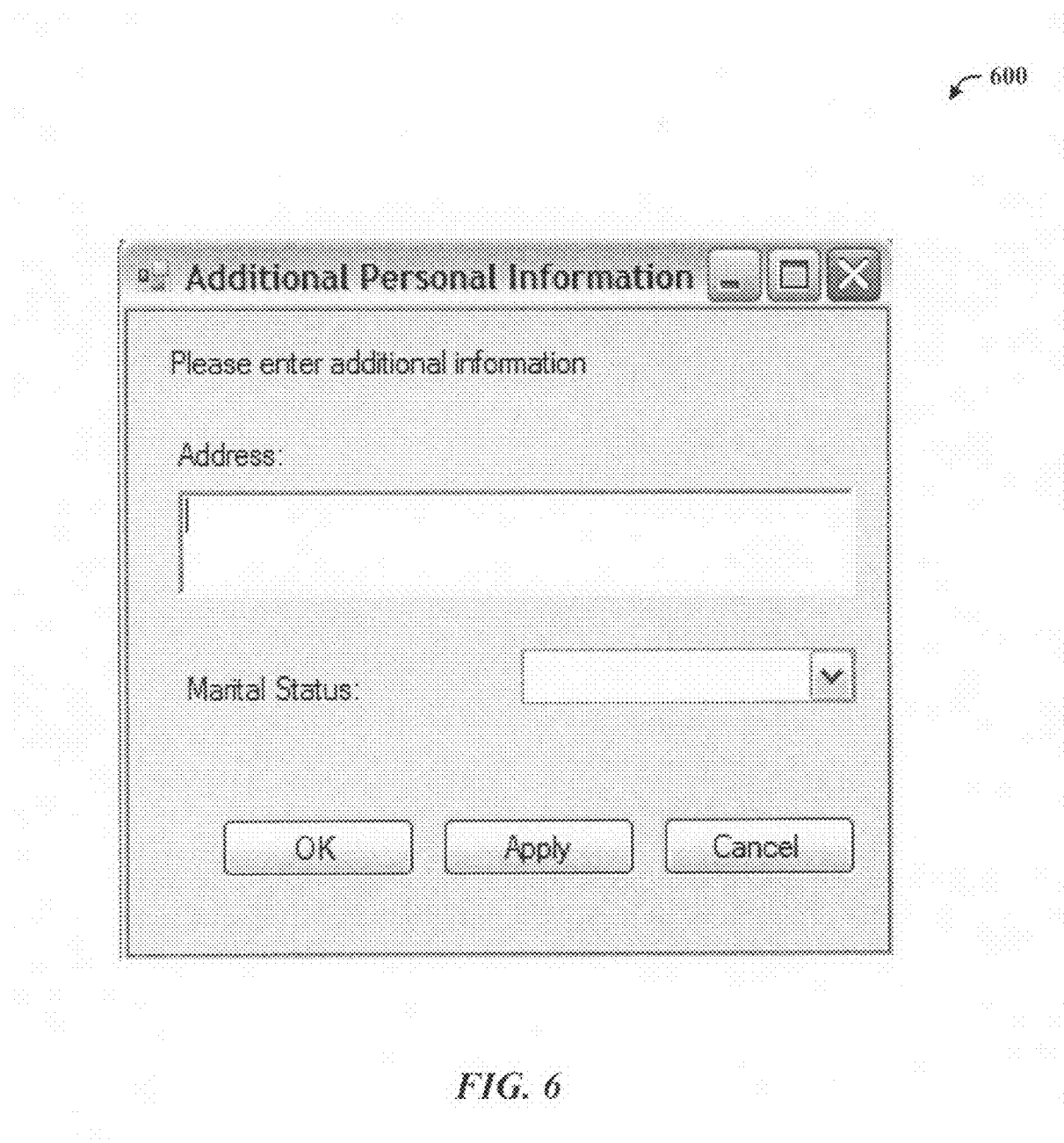
FIG. 6 illustrates an exemplary user interface of an additional personal information page.

Referring to FIG. 5, an exemplary user interface of a property page 500 is illustrated. Selection of a "More Info . . . " button 510 launches a dialog shown in FIG. 6 which illustrates an exemplary user interface of an additional personal information page 600.

In this example, a WMI repository is accessed as the data store. Exemplary metadata for a UI property page that contains three controls (one check box and two edit controls) can be represented as follows:

```
<propertyPage name="PersonalInfo" dialogid="IDD_PERSONAL_INFO">
    <controls>
        <control id="IDC_PERSONAL_INFO" type="CHECK" class="A_PERSONAL"
        property="StorePersonalInfo">
        <control id="IDC_NAME" type="TEXT" class="A_PERSONAL"
        property="Name" maxLength="150" nullAllowed="FALSE">
            <errors>
            <error type="VAL_ERR" errCode="E_NAME_TOO_LONG"
            dispId="IDS_ERROR_LONG_Name"></error>
            <error type="VAL_ERR" errCode="E_NULL"
            dispId="IDS_ERROR_NULL_NAME"></error>
            </errors>
        </control>
        <control id="IDC_AGE" type="NUM" class="A_PERSONAL"
        property="Age" defaultValue="30" minVal="0" maxVal="120"
            nullAllowed="FALSE">
            <errors>
            <error type="VAL_ERR" errCode="E_NOT_IN_RANGE"
            id="IDS_ERROR_AGE_INVALID"></error>
            <error type="VAL_ERR" errCode="E_NULL"
            dispId="IDS_ERROR_NULL_AGE"></error>
            <error type="VAL_ERR" errCode="E_TYPE_MISMATCH"
            id="IDS_ERROR_AGE_INVALID_TYPE"></error>
            </errors>
        </control>
        <control type="RADIO" class="A_PERSONAL" property="Sex"
    defaultValue="Female">
        <groupedControl id="IDC_MALE_RADIO"
        enum="Male"></groupedControl>
```

-continued

```
      <groupedControl id="IDC_FEMALE_RADIO"
      enum="Female"></groupedControl>
    </control>
    <control id="IDC_MORE_INFO_BUTTON" type="BUTTON"
dialogid="IDD_MORE_INFO_DIALOG" />
    </control>
  </controls>
</propertyPage>
<dialog name="MoreInfo" dialogid="IDD_MORE_INFO_DIALOG">
  <controls>
    <control id="IDC_ADDRESS" type="TEXT" class="A_PERSONAL"
    property="Address" maxLength="500"
        nullAllowed="TRUE">
      <errors>
    <error type="VAL_ERR" errCode="E_ADDR_TOO_LONG"
    displd="IDS_ERROR_LONG_ADDR"></error>
      <errors>
    </control>
    <control id="IDC_MARITAL_STATUS_COMBO" type="CBSTRINGENUM"
    class="A_PERSONAL"
        property="MaritalStatus">
        <stringResource id=IDS_SINGLE"
enum="Single"></stringResource>
        <stringResource id=IDS_MARRIED"
enum="Married"></stringResource>
        <stringResource id=IDS_Divorced"
enum="Divorced"></stringResource>
        <stringResource id=IDS_OTHER"
enum="Other"></stringResource>
    </control>
  </controls>
</dialog>
```

It is to be appreciated that while the above code illustrates exemplary metadata expressed in XML, metadata can be expressed in any suitable format.

Each property page or dialog contains a top level <propertyPage> or <dialog> element. In this example, there is one property page and one dialog. "Name" is a friendly name—the "dialogid" maps to the actual dialog definition which can be stored, for example, in a resource file.

Within a property page of dialog, there can be several UI controls each represented by a <control> element in the metadata. The control has a type attribute that describes the type of control. The "id" attribute of the control maps to the UI definition of the control (e.g., stored in a resource file). Based on the type, the UI controls driver 230 can manage user interaction with the particular control.

The "class" and "property" attributes together describe how to read and write data from and to the data source 220. The data stores driver 240 employs these attributes to read and/or write data to the data source(s) 220. For example, in the above case the Name is stored in attribute "Name" of WMI class "A_PERSONAL".

The <control> element can also contain validation attribute(s). In the example code presented above, the "Name" control contains "maxLength" and "nullAllowed" attributes. Similarly, the "Age" control contains the "minVal" and "maxVal" attributes. These attributes can be used by the data validation module 260 to validate data. For example, when the end user inputs a name and selects "OK", the name that was entered can be passed to the data validation module 260. The data validation module 260 then ensures that the name does not exceed one-hundred fifty characters and is not empty. If either of these conditions is violated, the data validation module 260 raises E_NAME_TOO_LONG or E_NULL error code, respectively. In this example, not all controls need to have some form of validation rules. For example, the radio buttons for the "Sex" control does not need to have validation since there are only two choices and one of them needs to be selected by the user.

The information contained within the <errors> element is used by the error handling module 270. In this example, each error code that needs to be handled has an <error> line that contains the error code and the corresponding error string ID. For example, the error string ID can match to a user friendly error message. For example, when an E_NAME_TOO_LONG error is raised by the data validation module 260, the error handling module 270 can map the error to IDS_ERROR_LONG_NAME and cause the corresponding string that maps to the error in the resource file (e.g., "The Name you entered is too long. Please restrict the name to 150 characters.") to be displayed via the graphical user interface provider 210.

The above example lists only a validation error (type=VAL_ERR); however, other errors (e.g., read/write errors, warnings, etc.) can occur. It is to be appreciated that different type of errors (represented by the "type" attribute above) can be supported.

Additionally, the error handling module 270 can be extended to support simple user input (e.g., Yes/No dialog such as: "Do you wish to continue?" and/or an OK/Cancel dialog such as: "This will save your data to disk. Press OK to confirm."). The error handling module 270 can also have a "fall through" error message that can be used to display generic error(s) if no error code matches are found (e.g., "Fatal error occurred. Please exit the application and try again.").

The above example contains an example where a dialog is launched from the main page by clicking on the "More Info . . . " button 510. A <control> element is used to represent this button and it specifies the dialog to launch in the dialogid tag. If the user clicks on this button, the UI controls driver 230 instantiates and displays the "MoreInfo" dialog of FIG. 6.

In the example code above, there are four different types of common controls—text box, check box, radio buttons, and combination box. The radio and the drop down controls contain the strings to display (in "id" attribute) as well as the value to store in the data source (in the "enum" attribute).

Further, the "Name", "Age" and "Sex" controls are nested within the "Personal Info" control. This is an example where the UI controls driver 230 manages interactions between controls. In this case, the UI controls driver 230 can automatically disable the nested "Name", "Age" and "Sex" controls if the "Personal Info" check box is not checked and can enable them when it is checked. This is an example where the interactions between controls can be represented in metadata and automatically managed by the system 200 without the developer having to write any code.

It is to be appreciated that only some of the most common UI constructs are illustrated in the example above. Other UI constructs such as help, tool tips, and the like can also incorporated into the framework.

In this example, once the framework for the generic controls is in place for each component in the system, writing new UI dialogs can be accomplished by authoring XML. As a result, much of the repetitive code can automatically be generated. This in turn reduces the code defects that are normally associated with UI coding.

ent in UI. Multi-instance data requires more advanced controls such as list boxes, tree view, etc. The framework can easily be extended to deal with such advanced UI controls.

Figure 7:
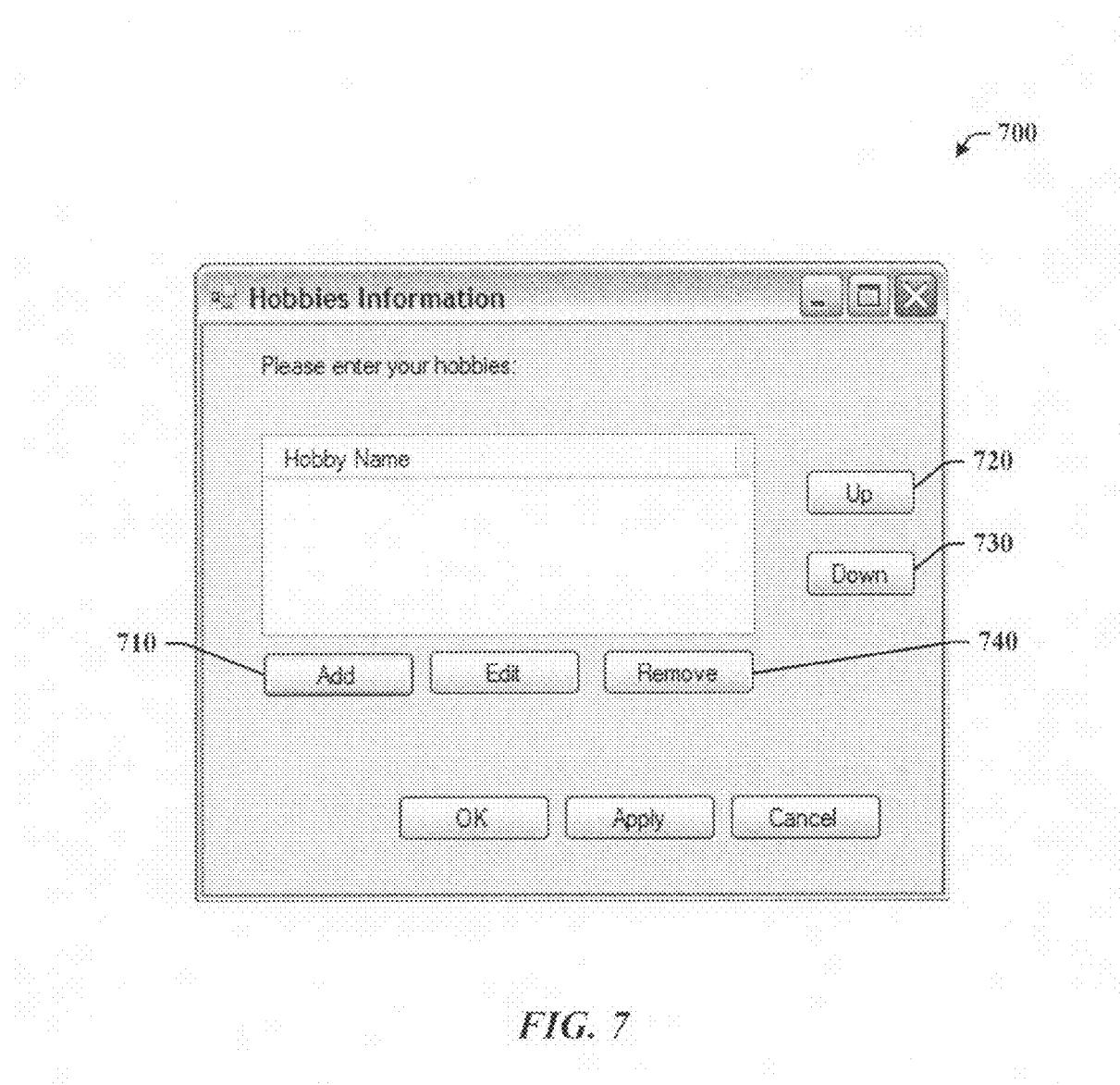
FIG. 7 illustrates an exemplary user interface with multi-instance data.

Referring to FIG. 7, an exemplary user interface 700 that allows an end user to identify hobbies as a prioritized list is illustrated. In this example, multi-instance data (e.g., stored as instances of a non-singleton WMI class "A_Hobbies") is employed.

Figure 8:
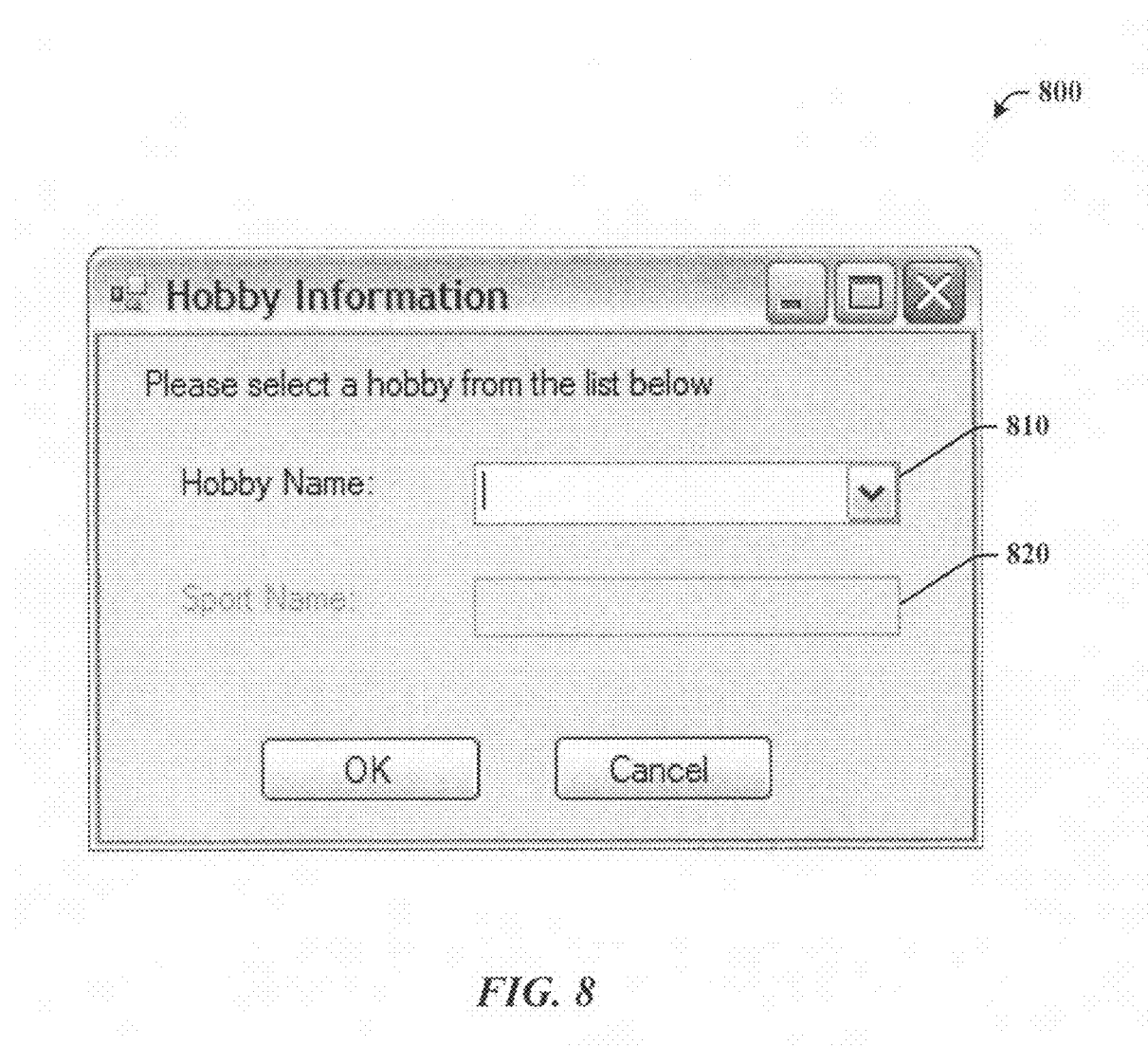
FIG. 8 illustrates an exemplary user interface.

In this example, when the end user clicks "Add" or "Edit", a new dialog is launched, as illustrated by a user interface 800 of FIG. 8. If the end user selects "sports", the end user is asked to enter a name of the sport as well. "Up"/"Down" buttons 720, 730 of the user interface 700 can be used to prioritize the hobbies. Similarly, a "Remove" button 740 can be used to erase an entry.

Corresponding metadata for the user interfaces 700, 800 (e.g., property page and dialog) can be represented by the following:

```
<propertyPage name="Hobbies" dialogid="IDD_HOBBIES_PAGE">
    <errors>
        <error type="VAL_ERR" hr="E_NO_HOBBIES"
        id="IDS_ERROR_ONE_OR_MORE_HOBBIES_NEEDED"></error>
    </errors>
    <controls>
        <control id="IDC_HOBBIES_LIST" type="LIST" class="A_HOBBIES"
        isPriorityList="true">
            <column id="IDS_NAME" type="TEXT" property="Name"></column>
            <control id="IDC_HOBBIES_ADD" dialogid="IDD_HOBBIES_ADD"
            type="ADDBUTTON" />
            <control id="IDC_HOBBIES_EDIT" dialogid="IDD_HOBBIES_ADD"
            type="EDITBUTTON" />
            <control id="IDC_HOBBIES_MOVE_UP"
            type="MOVEUPBUTTON"></control>
            <control id="IDC_HOBBIES_MOVE_DOWN"
            type="MOVEDOWNBUTTON"></control>
            <control id="IDC_HOBBIES_REMOVE" type="REMOVEBUTTON"></control>
        </control>
    </controls>
</propertyPage>
<dialog name="HobbiesAdd" dialogid="IDD_HOBBIES_ADD"
overrideInitdialog="HobbiesInitDialog">
    <controls>
        <control id="IDC_HOBBIES_COMBO" type="CBSTRINGENUM"
        class="A_HOBBIES" property="Name">
            <stringResource id= "IDS_SWIMMING"
            enum="SWIMMING"></stringResource>
            <stringResource id= "IDS_READING"
            enum="READING"></stringResource>
            <stringResource id= "IDS_SPORTS"
enum="SPORTS"></stringResource>
            <stringResource id= "IDS_COOKING"
            enum="COOKING"></stringResource>
                <events>
                    <event id="CBN_SELCHANGE"
            handler="OnHobbiesSelectionChange"></event>
                </events>
        </control>
        <control id="IDC_SPORT_NAME" type="TEXT"
        customDDXHandler="DDX_SportName" class="A_HOBBIES"
            property="SportName" nullAllowed="TRUE">
        </control>
    </controls>
</dialog>
```

Metadata can further be used to describe advanced common controls. Usually, there are two types of data in data sources 220: single instance and multi-instance data. Generally, the controls to handle these two types of data are differ- In this example code, a <control> element is of "type" "list" which describes to the components within the framework that the UI control involves multi-instance data, in this example, the multi-instance WMI class A_HOBBIES. The list is a prioritized list as indicated by the "isPrioritzedList" attribute in the metadata. The list contains one column (e.g., "Name") and a new element "Column" is used to indicate that arrangement. The UI controls driver 230 and the data exchange modules 280 can employ this information to manage the user input and data exchanges with each column in the list.

Each button on a page can be represented by a <control> element. The "type" of the button indicates to the UI controls driver 230 an action to take when that button is pressed. For example, when the user clicks the "Add" or "Edit" buttons, the new dialog with "dialogid" IDD_HOBBIES_ADD is launched. Similarly, the UI controls driver 230 can take the standard actions when the "Up", "Down" or "Remove" button is clicked (e.g., move the selected entry up/down or remove an entry altogether).

In this example, the <errors> section is not tied to any particular control. Rather, the <errors> section is tied to the page. This is an indication to the error handling module 270 to catch the errors E_NO_HOBBIES anywhere in the page and translate that to the string represented by IDS_ERROR_ONE_OR_MORE_HOBBIES_NEEDED. In this case, if the user presses "OK" or "APPLY" on the page without entering any entries, the data validation module 260 throws that error code. This error code is not tied to a particular control on the page; it is tied to the page itself. Such "page level" errors are not unique to pages that contain multi-instance data. Page level error(s) can be used in pages with single instance data as well.

Continuing, the IDD_HOBBIES_ADD dialog illustrated in FIG. 8 contains a dropdown combination box 810 (e.g., IDC_HOBBIES_COMBO) and an edit box 820 (e.g., IDC_SPORT_NAME). The edit box 820 is enabled only if "Sports" is selected in the combination box 810. This can be achieved through custom actions as explained in greater detail below.

In one embodiment, the system 200 can support an ability to add custom actions and/or custom operations. While the system 200 can provide a default implementation, if this default implementation does not further the purpose for a particular page, then a UI developer may add his/her own custom operations. The metadata provides the ability to add these custom operations.

For example, in the IDD_HOBBIES_ADD dialog of the previous code, there are three different places where custom actions are added. First, when the dialog is initialized, the system 200 can notice that there is an "overrideinitdialog" attribute in the <dialog> tag. This would cause the system 200 to call a custom operation defined in the metadata for initializing the dialog (instead of calling the generic "default" implementation). In this example, this can be achieved by calling a function named "HobbiesInitDialog". The signature of this function can be predefined and the system 200 can pass certain parameters to this function and expect certain results from it. Otherwise, the function can perform action(s) as specified by the UI developer. This function can be written by the UI developer and invoked by the system 200 at runtime.

Similarly, the page also has a custom implementation for handling the "CBN_SELCHANGE" message. This message can be thrown when something changes in the combination box control. The corresponding custom function that handles this event "OnHobbiesSelectionChange" can enable/disable the text box based on whether "Sports" is selected in the combination box or not.

Further, there is a custom data exchange implementation for the IDC_SPORT_NAME control. This can cause the system 200 to not invoke the generic data exchange module for the Editbox, but instead call the custom data exchange function provided by the UI developer (e.g., "DDX_SportName"). This function can do something in addition to actions of the generic function.

Additional examples of custom operations that can be included in metadata and/or the system 200 include: custom validation rules, custom error and warning handling, custom dialog/property page initializers/constructors/destructors, custom data exchange routines, custom events, custom messages, and the like.

In the examples presented above, the UI is described as predefined in a resource file with the metadata coupling various elements of the UI to the code that drives the UI elements. However, those skilled in the art will recognize that metadata can be used to generate an actual UI layout. That is, information can be embedded in the metadata to generate and render the UI.

For example, instead of employing predefined IDs for controls and dialogs, the relative or absolute positions can be stored in the metadata. The system 200 can use the positions to generate the resource file(s). The IDs can then be auto-generated and referred without involvement of the UI developer. Similarly, instead of mapping error codes to error string IDs, the actual strings can be defined directly in the metadata.

As discussed previously, in one embodiment, each component in the system 200 has its own interface that defines interaction with other components. This loose coupling can facilitate extensibility of the system 200.

For example, in a first version of a product implemented in MMC, the UI controls driver 230 can have a particular interface that other components (e.g., the data exchange modules 280) are aware of and can interact with. In version three, the product is implemented in HTML instead of MMC. To reflect this modification, a new UI controls driver 230 is created for HTML. The other components are not modified to reflect the change from MMC to HTML. Similarly, the metadata, for the most part, would remain unchanged. If there is a need to support both MMC and HTML based UI in a particular version of the product, two different UI controls drivers or one that understands how to deal with both MMC and HTML can be employed.

In this manner, by writing one component, the UI can be produced in two different UI technologies. Since the underlying code is the same for both, the behavior would be the substantially the same in both MMC and HTML (e.g., the way the errors are handled, the custom operations, the way data is read/written to the stores, etc.). Thus, the end user is presented with a consistent experience.

Figure 9:
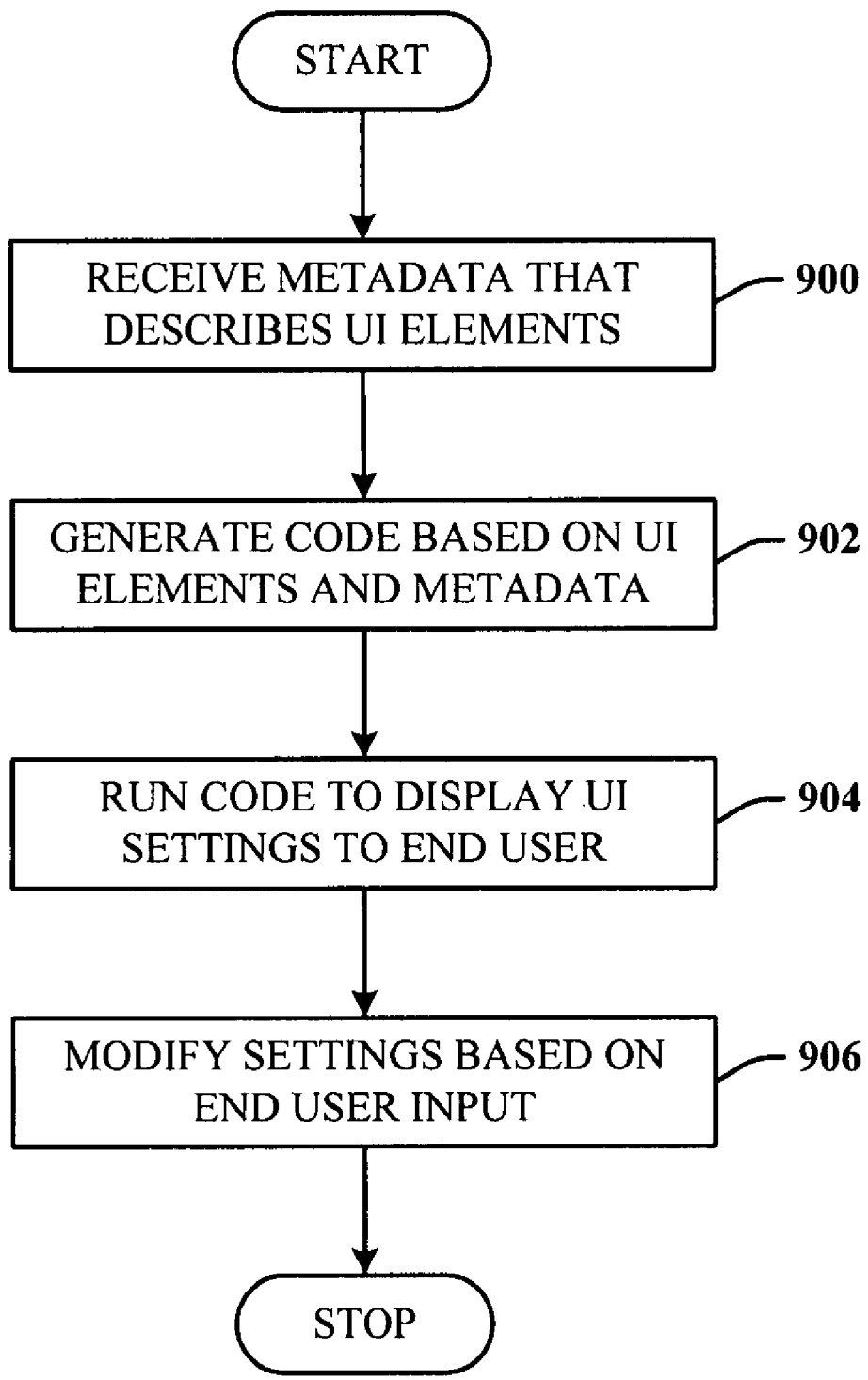
FIG. 9 illustrates a method of generating a settings UI.

FIG. 9 illustrates a method of generating a settings UI. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 900, metadata that describes UI elements is received. At 902, code is generated based on the UI elements and the metadata. At 904, the code is run to display a settings UI to an end user. At 906, setting(s) are modified based on input received from the end user.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
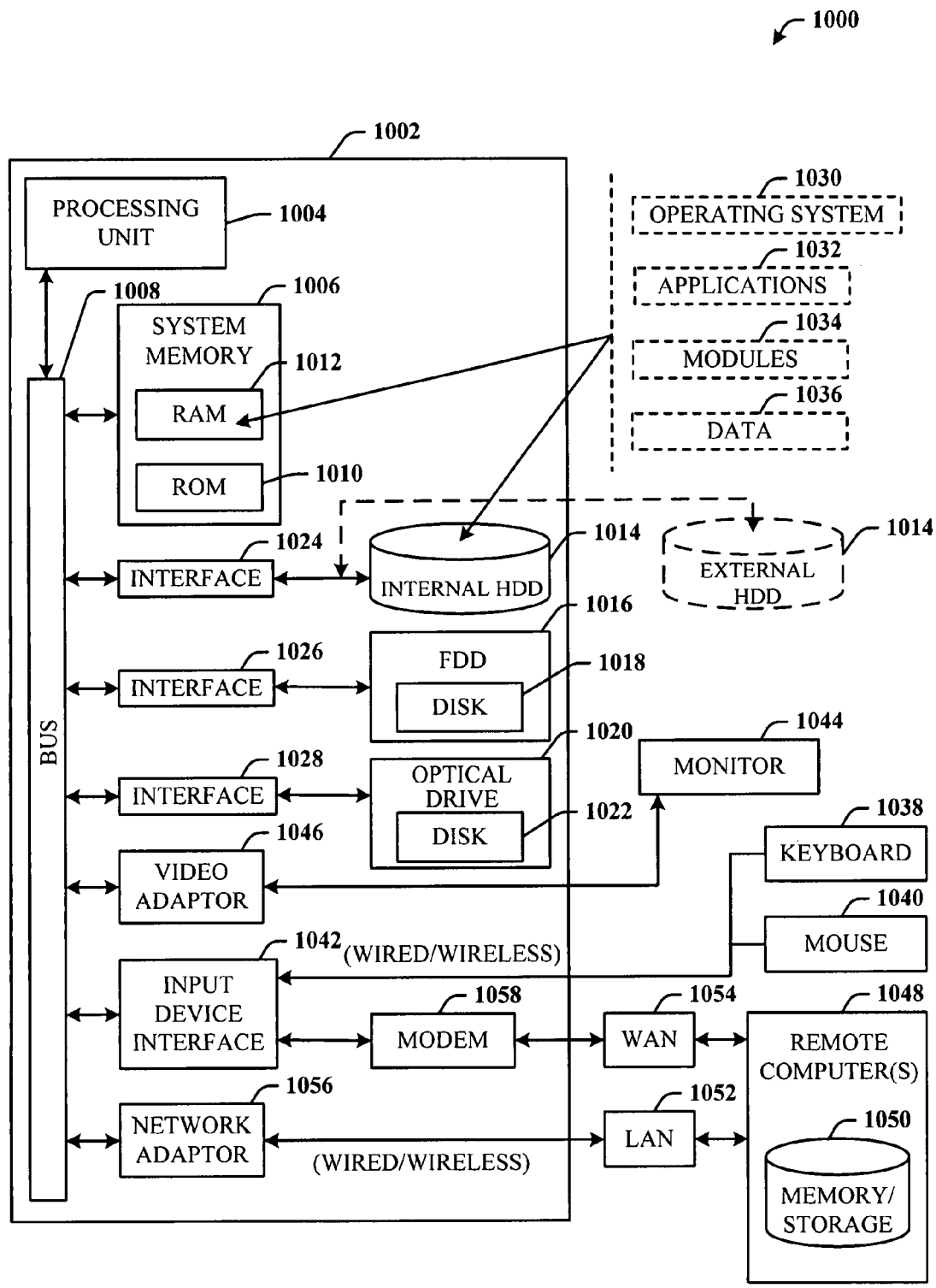
FIG. 10 illustrates a computing system operable to execute the disclosed architecture.

Referring now to FIG. 10, there is illustrated a block diagram of a computing system 1000 operable to execute the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wired/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

Referring briefly to FIGS. 3 and 10, the graphical user interface provider 210 can provide information to an end user via the monitor 1044 and/or other peripheral output devices. Further, the graphical user interface provider 210 can receive information from the end user via the mouse 1040, the keyboard 1038 and/or other input devices.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 11:
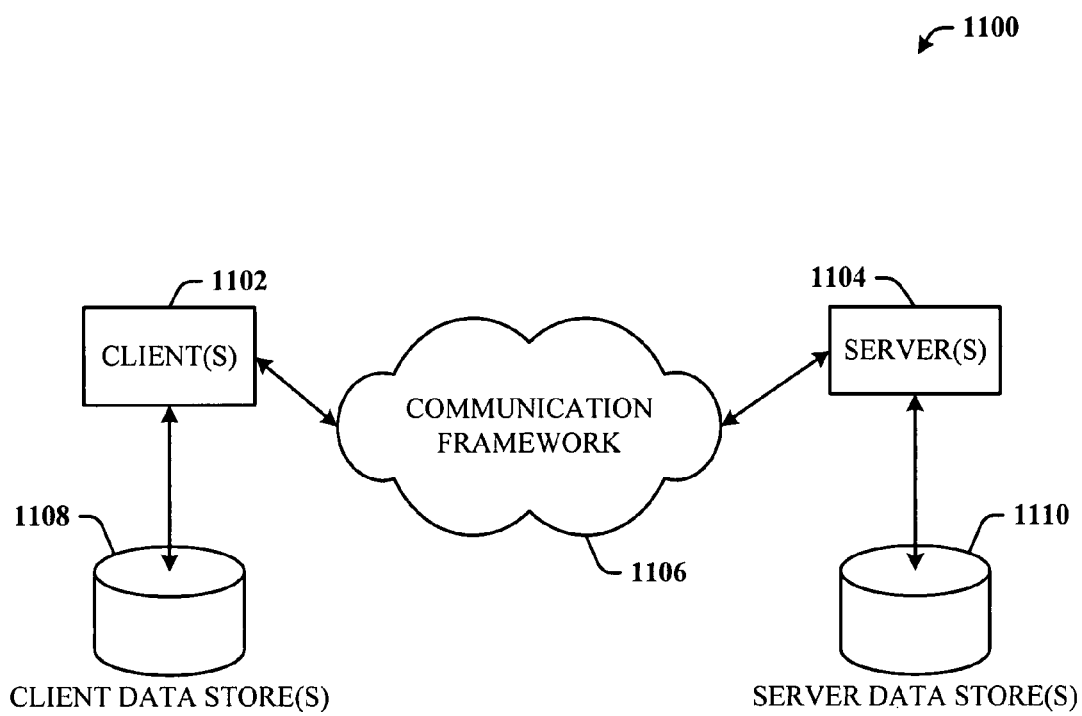
FIG. 11 illustrates an exemplary computing environment.

Referring now to FIG. 11, there is illustrated a schematic block diagram of an exemplary computing environment 1100 that facilitates a settings user interface. The system 1100 includes one or more client(s) 1102. The client(s) 1102 can be hardware and/or software (e.g., threads, processes, computing devices). The client(s) 1102 can house cookie(s) and/or associated contextual information, for example.

The system 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates a settings user interface, comprising:
    a plurality of user interface elements;
    stored metadata that describes instances of the plurality of user interface elements and associated interactions;
    a code generation component for automatically generating, by a processor, code for the settings user interface based, at least in part, upon the stored metadata and the plurality of user interface elements, the code to be compiled once generated, wherein the generated code validates data according to a set of validation rules defined in the stored metadata and when a validation rule is violated an error code is raised;

an error handling module for receiving the error code and translating the error code to a user-friendly error message according to the stored metadata, and for setting focus on a section of the settings user interface to enable an operator to correct the error; and a data source component for receiving the code generated by the code generation component and for interacting with a data source to store configuration data for the settings user interface, wherein code for the data source component is generated from the metadata.

2. The system of claim 1, wherein the stored metadata is based on an XML (extensible markup language) file.

3. The system of claim 1, wherein the generated code facilitates interaction between an end user and one or more data sources, the one or more data sources storing configuration data.

4. The system of claim 3, wherein the configuration data is stored in at least one of a SQL database, an Active Directory datastore, a registry, an XML file, or a text file.

5. The system of claim 1, wherein the generated code performs at least one of gathering a user input, handling a user interface event, validating collected data, handling an error, or managing interactions between a plurality of user interface controls.

6. The system of claim 1, wherein the code is generated at runtime.

7. The system of claim 1, wherein the code is generated at compile time.

8. A computer-implemented system for facilitating a settings user interface, comprising:

a user interface controls driver for managing a user interface control;

a data stores driver for interacting with a data source;

a data source component for interacting with the data source to store configuration data for the settings user interface, wherein code for the data source component is generated from stored metadata that describes instances of the plurality of user interface elements and associated interactions;

a data exchange module for populating the user interface control with data stored in the data source received from the data stores driver;

a data validation module for validating, by a processor, data associated with the user interface control, the data received from an end user, the data validated according to a set of validation rules defined in stored metadata, and for raising an error code when the data validation module determines that the data received from the end user is incorrect; and, an error handling module for processing the error code, the error handling module employing code automatically generated based on the stored metadata and a plurality of user interface elements, the code to be compiled once generated, the error code to be translated to a user-friendly error message according to the stored metadata, and for setting focus on a section of the settings user interface to enable an operator to correct the error.

9. The system of claim 8, wherein at least one of the user interface controls driver, the data stores driver, the data validation module, or the data exchange module employs code automatically generated based on stored metadata and a plurality of user interface elements.

10. The system of claim 9, wherein the stored metadata describes instances of the plurality of user interface elements and associated interactions.

11. The system of claim 8, further comprising a plurality of data exchange modules, each data exchange module associated with a particular user interface control.

12. The system of claim 8, wherein the system facilitates interaction between the end user and the data source, the data source storing configuration data.

13. The system of claim 8, wherein the system performs at least one of gathering an end user input, handling a user interface event, validating collected data, handling an error, or managing interactions between a plurality of user interface controls.

14. The system of claim 8, wherein the user interface controls driver comprises a custom action, the custom action is based on stored metadata.

15. The system of claim 8, further comprising an abstraction layer that facilitates communication between the data source and the data stores driver.

16. A computer-implemented method of generating a settings user interface, comprising:

receiving metadata that describes user interface elements;

automatically generating a first set of code for the settings user interface based on the user elements and received metadata, the first set of code to be compiled once generated;

generating a second set of code from the metadata for a data source component for receiving the first set of code and for interacting with a data source to store configuration data for the settings user interface;

executing the generated code to display the settings user interface, wherein the generated code validates data according to a set of validation rules defined in the received metadata;

raising an error code when a validation rule is violated;

translating the error code to a user-friendly error message according to the received metadata; and setting focus on a section of the settings user interface to enable an operator to correct the error.

17. The method of claim 16, further comprising modifying a setting based on received end user input.

18. The method of claim 16, wherein the metadata is based on an XML file.

19. The method of claim 16, wherein the first set of code is automatically generated at runtime.

20. The method of claim 16, wherein the first set of code is automatically generated at compile time.

* * * * *